United States Patent
Kubota et al.

[11] Patent Number: 5,930,378
[45] Date of Patent: Jul. 27, 1999

[54] DYNAMIC IMAGE PROCESSING APPARATUS AND METHOD

[75] Inventors: Susumu Kubota, Kanagawa-ken; Toshimitsu Kaneko, Tokyo, both of Japan

[73] Assignee: Kabushiki Kaisha Toshiba, Kawasaki, Japan

[21] Appl. No.: 08/791,493

[22] Filed: Jan. 27, 1997

[30] Foreign Application Priority Data

Jan. 31, 1996 [JP] Japan ................... 8-015643

[51] Int. Cl.$^6$ ....................................... G06K 9/00
[52] U.S. Cl. ............................ 382/107; 382/205
[58] Field of Search ................... 382/205, 103, 382/281, 285, 107, 154, 255, 236; 348/285, 154–155, 699–700; 345/156, 435

[56] References Cited

U.S. PATENT DOCUMENTS

| | | | |
|---|---|---|---|
| 4,638,445 | 1/1987 | Mattaboni | 364/513 |
| 4,731,860 | 3/1988 | Wahl | 382/276 |
| 5,063,603 | 11/1991 | Burt | 382/119 |
| 5,220,615 | 6/1993 | Ishii et al. | 382/100 |
| 5,430,810 | 7/1995 | Saeki | 382/281 |
| 5,548,667 | 8/1996 | Tu | 382/285 |
| 5,581,276 | 12/1996 | Cipolla et al. | 345/156 |
| 5,638,116 | 6/1997 | Shimoura et al. | 348/118 |
| 5,644,386 | 7/1997 | Jenkins et al. | 382/224 |

OTHER PUBLICATIONS

E. Lutton et al., "Contribution to the Determination of Vanishing Points Using Hough Transform", IEEE Transactions on Pattern Analysis and Machine Intelligence, 16(4):430–438 (1994).

J. Heikkonen, "Recovering 3–D Motion Parameters From Optical Flow Field Using Randomized Hough Transform", Pattern Recognition Letters, 16 pp. 971–978 (1995).

T. Tian et al., "Recovering 3D Motion of Multiple Objects Using Adaptive Hough Transform", IEEE, pp. 284–289 (1995).

"Probability Distributions of Optical Flow", Eero P. Simoncelli et al., IEEE, 1991, pp. 310–315.

*Primary Examiner*—Leo H. Boudreau
*Assistant Examiner*—Bhavesh Mehta
*Attorney, Agent, or Firm*—Finnegan, Henderson, Farabow, Garrett & Dunner, L.L.P.

[57] ABSTRACT

In a dynamic image processing apparatus of the present invention, the focus of contraction of the optical flow of the background in the dynamic image is extracted. When a series of dynamic images are inputted, an optical flow extraction section extracts an optical flow representing motion vector of each block between two neighboring dynamic images. A Hough transform section votes each optical flow of the dynamic image to vote space by unit of block. The vote space comprises two planes and one circle positioned in parallel to each other. The dynamic image is included in one plane. The other plane is positioned symmetrically to the one plane with respect to a center position of the circle. The Hough transform section selects a block whose voted value is maximum in all blocks of the vote space. The selected block corresponds to the focus of contraction of the optical flow of background in the dynamic image.

8 Claims, 10 Drawing Sheets

VOTE AREA
IMAGE PLANE
VOTE SPACE

OPTICAL FLOW
IMAGE PLANE
FOCAL LENGTH (UNKNOWN)
INFINITE DISTANT POINT

DYNAMIC IMAGE PROCESSING APPARATUS AND METHOD

BACKGROUND OF THE INVENTION

1. Field of the Invention

The present invention relates to a dynamic image processing apparatus and method for extracting a focus of contraction of an optical flow.

2. Description of the Related Art

Recent improvement in computer and memory device technology have led to faster execution of dynamic image processing and accelerated transformation of information to multimedia. Few developments have been made, however, in dynamic image processing technique.

Techniques for extracting parameters associated with camera operation, i.e. zoom (change of focal length), pan (rotation between right and left), tilt (rotation along top and bottom), parallel movement and techniques for extracting a background and moving object from the dynamic image have been developed. However, although prior art research to estimate camera-parameters aims at image instrumentation in stationary environments, no adequate techniques exist for extracting camera parameters from dynamic image environments, including an image with a background and moving object. Additionally, there are no technique to process the image in which the focal length is changed by zoom-operation. These problems are discussed more fully in the following references.

(1) Tina Yu Tian and Mubarak Shah, "Recovering 3D Motion of Multiple Objects Using Adaptive Hough Transform", ICCV, pp 284–289, 1995.

(2) Jukka Heikkonen, "Recovering 3-D motion parameters from optical flow field using randomized Hough transform", Pattern Recognition Letters 16, pp. 971–978, 1995.

One prior art technique for extracting a focus of contraction of optical flow (motion vector of each block between two neighboring dynamic images) to estimate the camera-parameter according to the prior art is explained in connecting with FIG. 1 and 2. FIG. 1 is a schematic diagram showing the relationship between a moving object and optical flow in a camera coordinate axis. FIG. 2 is a schematic diagram showing the relationship between the optical flow in an image plane and the direction of movement of the object according to the prior art. In FIG. 1, the center of the camera's optical axis is at the origin, a horizontal direction is shown as the X-axis, a vertical direction is shown as the Y-axis, a direction of the optical axis is shown as the Z-axis. If the camera-position is moved freely and operated by zooming, the camera-parameter move parallel rotate around each axis, and change focal length.

Where camera movement is restricted to parallel movement and changes in focal length, a group of the optical flows of the background in the image defines the focus of contraction (a destination point of the optical flows). If rotation elements around the X-axis and the Y-axis are included in the movement of the camera, there is no focus of contraction of the optical flow. If the camera-lens is not wide-angle, rotation elements around X-axis and Y-axis can be approximated by parallel motion; hence, no problem arises from the assumption that there is a focus of contraction of the optical flow. However, if rotation elements around the optical axis of the camera are included, there is no focus of contraction of the optical flow. Therefore, processing where the rotation around the optical axis is included is different from processing where the rotation element around the optical axis is not included. In this explanation, processing where the rotation element around the optical axis is not included. Determining the focus of contraction is a key to separating the background from the moving object in the image. However, when the focus of contraction of the background is extracted by the optical flow in the image, the optical flow of the moving object has an is erroneous value. In this situation, if the optical flow of the moving object and the optical flow of the background are mixed in the image, a Hough transform may be used to extract the focus of contraction of the background.

In FIG. 1, the optical flow represents a motion vector of a object projected to the image plane. Conversely, if the optical flow is assigned to the image plane, actual relative movement of the object can be determined. In FIG. 2, on a plane including a view point (o) and the optical flow, a plurality of vectors whose start point is on line between the view point (o) and the start point (p) of the optical flow, and whose end point is on line between the view point (o) and the end point (q) of the optical flow are determined. The plurality of vectors corresponding to the optical flow (pq) are distributed in fan-shaped part (oab). Therefore, a "vote space" for determining the focus of contraction is a unit spherical surface.

As for each optical flow in the image plane, a predetermined value is voted to the fan-shaped part (oab) in the unit spherical surface. When the vote for all optical flows is completed, a part whose voted value is maximum is extracted as motion vector corresponding to the optical flow of the background. This technique is disclosed in Evelyne Lutton, Henri Maitre, and Jaime Lopez-Krahe, "Contribution to the Determination of Vanishing Points Using Hough Transform", IEEE Transactions on Pattern Analysis and Machine Intelligence, Vol.16, No.4,pp.430–438, 1994. In this method, as shown in FIG. 2, a focal length between the image plane and the center of the unique spherical surface is previously known. Using this known focal length, a position of the optical flow on the image plane is determined according to the extracted motion vector. However, if the focal length is not known (because, eg., the focal length is not known originally or the focal length is changed by zooming), the relationship between the position of the optical flow and the extracted motion vector cannot be determined. Therefore, this technique is not adequate for this case.

SUMMARY OF THE INVENTION

It is an object of the present invention to provide a dynamic image processing apparatus and method to correctly extract the focus of contraction of the optical flow of the background in the dynamic image.

A dynamic image processing apparatus consistent with the invention comprises an image input element for inputting a series of dynamic images; an optical flow extraction element for extracting an optical flow representing motion vector of each block between two neighboring dynamic image; a Hough transform element for voting each optical flow of the dynamic image to vote space by unit of block. The vote space comprises two planes and one circle positioned in parallel to each other. The dynamic image is included in one plane, the other plane being positioned symmetrically to the one plane for a center position of the circle. The Hough transform element also selects a block whose value is maximum in all blocks of the vote space. The selected block corresponds to the focus of contraction of the optical flow of background.

A method for processing a dynamic image consistent with the invention comprises the steps of: inputting a series of dynamic images; extracting an optical flow representing motion vector of each block between two neighboring dynamic images; voting each optical flow of the dynamic image to vote space by unit of block. The vote space comprises two planes and one circle positioned in parallel to each other. The dynamic image is included in one plane, the other plane being positioned symmetrically to the one plane for a center position of the circle. Additional steps include selecting a block whose voted value is maximum in all blocks of the vote space. The selected block corresponds to the focus of contraction of the optical flow of background.

A computer readable memory containing computer-readable instructions to process a dynamic image consistent with the invention comprising an instruction element for causing a computer to input a series of dynamic images; an instruction element for causing a computer to extract an optical flow representing motion vector of each block between two neighboring dynamic images; an instruction element for causing a computer to vote each optical flow of the dynamic image to vote space by unit of block, the vote space comprising two planes and one circle positioned in parallel to each other, the dynamic image being included in one plane, the other plane being positioned symmetrically to the one plane for a center position of the circle; an instruction element for causing a computer to select a block whose voted value is maximum in all blocks of the vote space. The selected block corresponds to the focus of contraction of the optical flow of background.

DETAILED DESCRIPTION OF THE PREFERRED EMBODIMENTS

Figure 1:
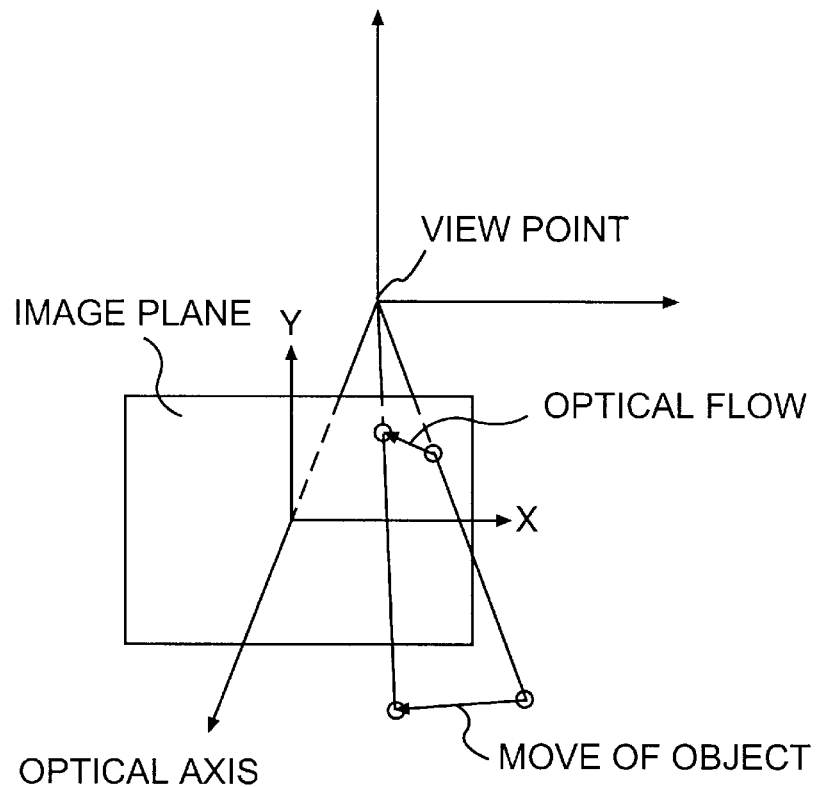
FIG. 1 is a schematic diagram showing the relationship between a moving object and its optical flow.
Figure 2:
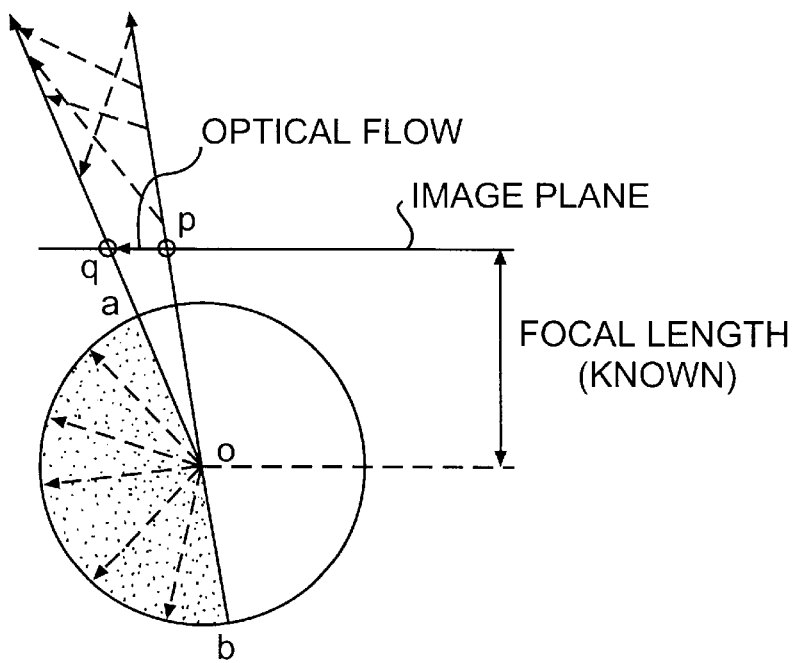
FIG. 2 is a schematic diagram showing the relationship between a moving object's optical flow in an image plane and possible movements of the object according to the prior art.
Figure 3:
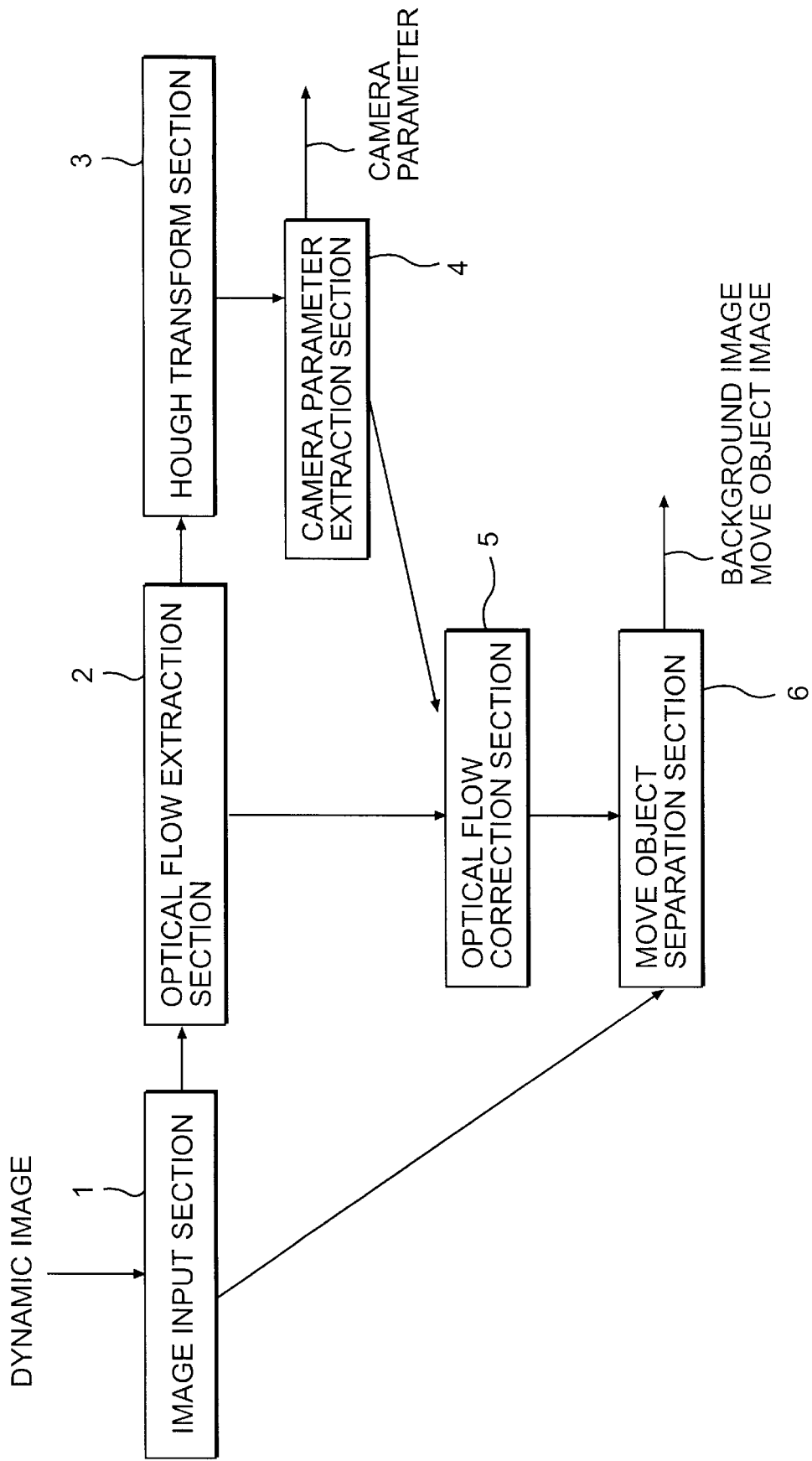
FIG. 3 is a block diagram of the dynamic image processing apparatus according to the present invention.
Figure 4:
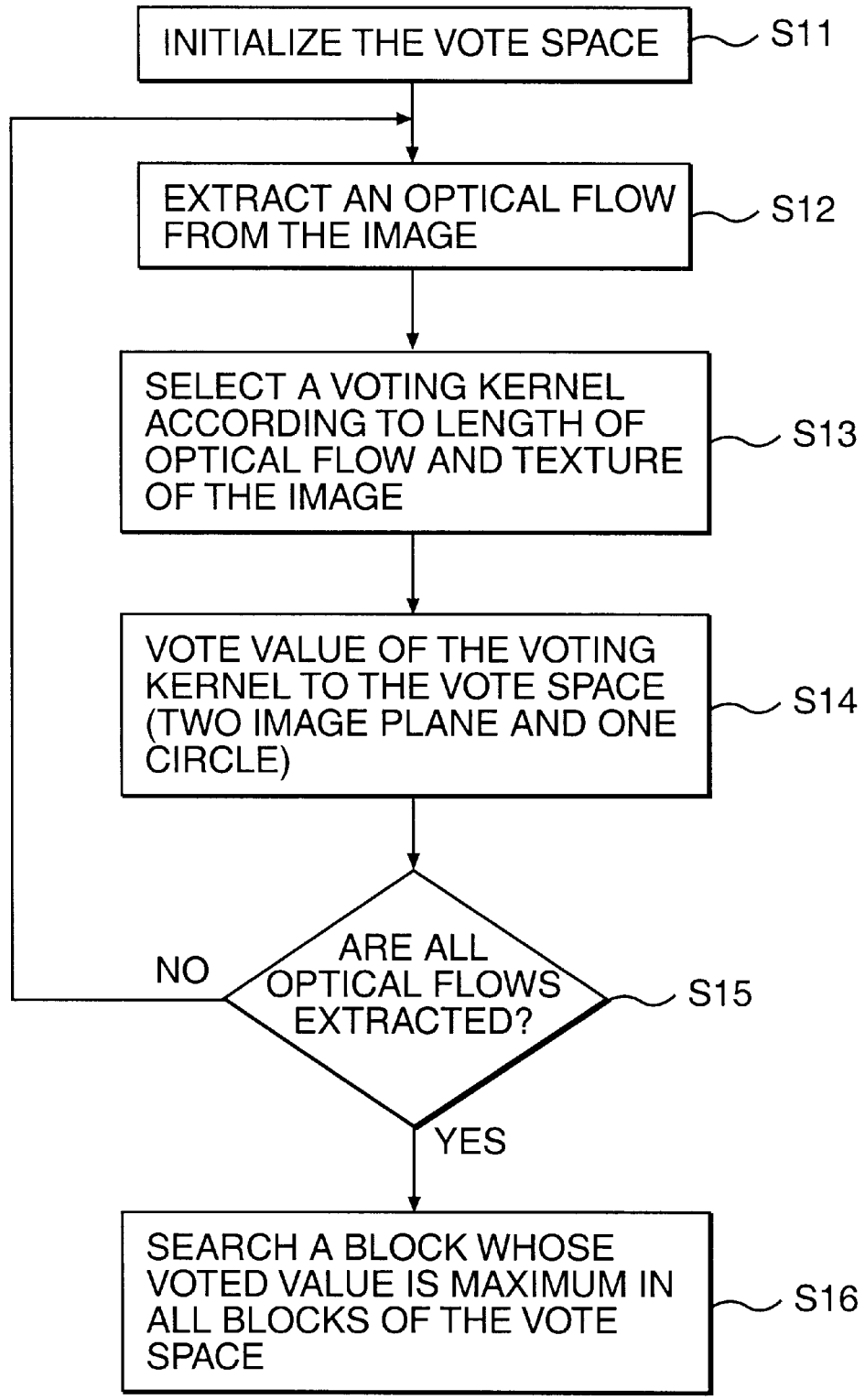
FIG. 4 is a flow chart showing an operation of the Hough transform section of the dynamic image processing apparatus shown in FIG. 3.
Figure 5:
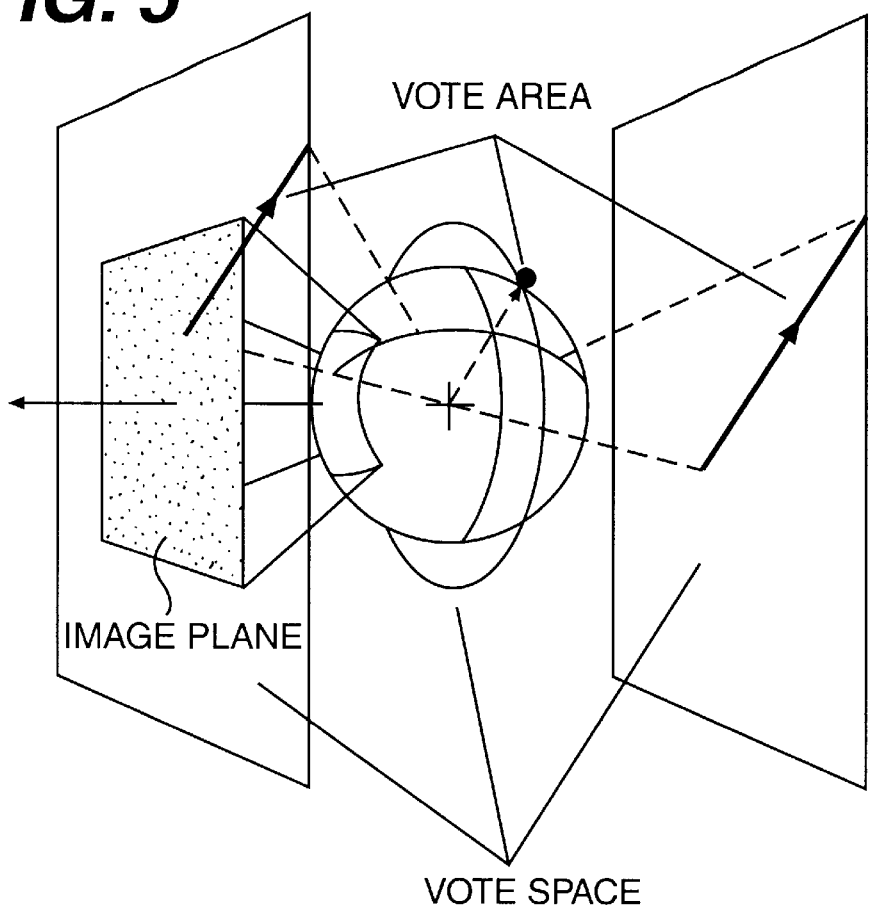
FIG. 5 is a schematic diagram showing a vote space for Hough transform according to the present invention.
Figure 6:
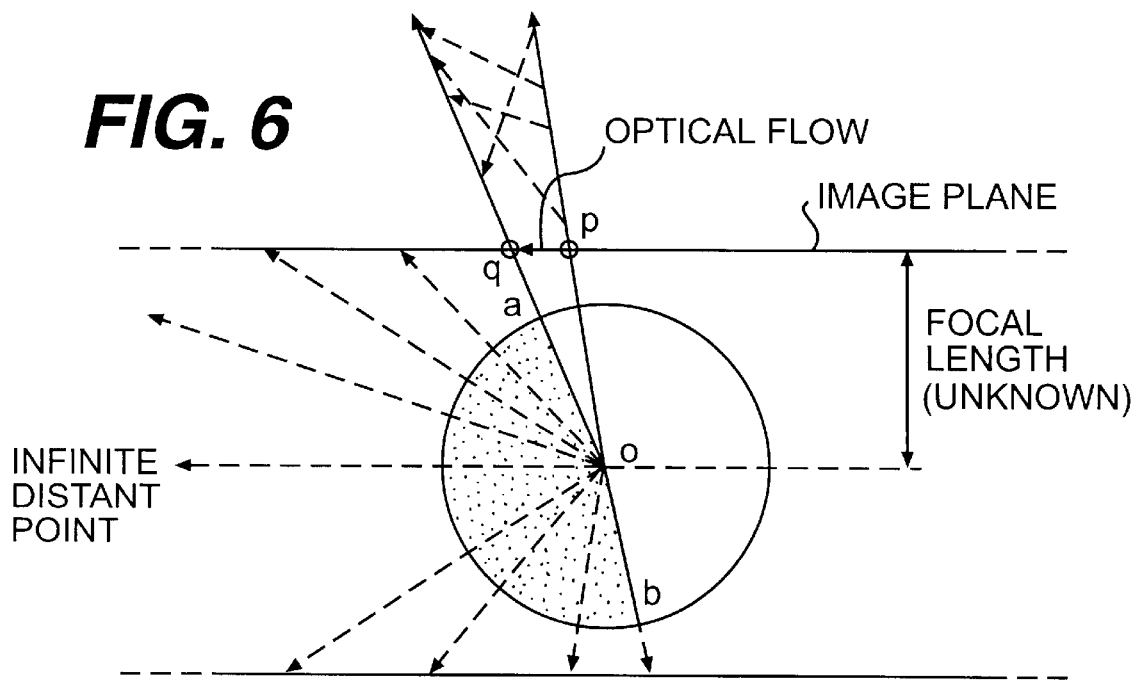
FIG. 6 is a schematic diagram showing a relationship between the optical flow and move direction of the object in the vote space according to the present invention.

The embodiments of the present invention are described below with reference to the drawings. FIG. 3 is a block diagram of the dynamic image processing apparatus of the present invention. FIG. 4 is a flow chart showing processing of a Hough transform section in the dynamic image processing apparatus. FIG. 5 is a schematic diagram showing a vote space for Hough transform. FIG. 6 is a schematic diagram showing a relation between the optical flow and moving vector of the object in the vote space.

As shown in FIG. 3, the dynamic image processing apparatus of the present invention comprises an image input section 1, an optical flow extraction section 2, a Hough transform section 3, a camera parameter extraction section 4, an optical flow correction section 5, and a move object separation section 6. Image input section 1 receives a series of the dynamic images. The optical flow extraction section 2 extracts the optical flow of each pixel (or block) between two neighboring images. The Hough transform section 3 extracts the focus of contraction of optical flow of the background in the image according to Hough transform. The camera parameter extraction section 4 estimates the camera parameter according to the focus of contraction extracted by the Hough transform section 3. The optical flow correction section 5 corrects the optical flow of the image according to the extracted optical flow of the background. The move object separation section 6 separates the background from the moving object in the image according to the corrected optical flow.

In a preferred embodiment, the above sections are inplemented as software modules executed on a processor. In alternative embodiments, these sections may be inplemented in hardware or a combination of hardware and software.

In the present invention, as shown in FIG. 5, the vote space preferably comprises three vote areas, which are two planes and one circle. The two planes and the one circle are located in parallel to in space. One of the two planes includes the image plane (including the optical flows) on its surface. The other plane is symmetrically located to the one plane with respect to the center point of the circle. When the predetermined value of the optical flow is voted to the three areas (two planes and one circle), the relation between the position on the image plane and the position on the vote space can be determined, even if the focal length is not known. In this case, the infinite distant point is not represented in the two planes. Therefore, the one circle whose center point is a view point is located on a plane perpendicular to the optical axis at the view point. As shown in FIG.

6, one motion vector to the infinite distant point is represented as the vote area in the one circle. A group of motion vectors above the one motion vector (upper part of the fan-shaped black part) is represented as the vote area in the one plane including the image plane. A group of motion vectors below the one motion vector (lower part of the fan-shaped black part) is represented as the vote area in the other plane.

The optical flow is extracted on the image. Therefore, the optical flow includes uncertainty of a pixel.

Figure 7:
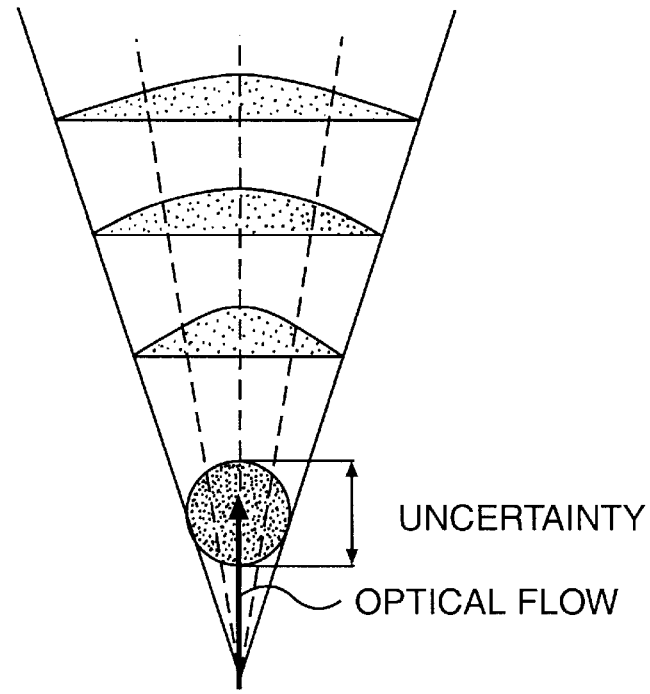
FIG. 7 is a schematic diagram showing a voting kernel of the optical flow according to the present invention.
Figure 8:
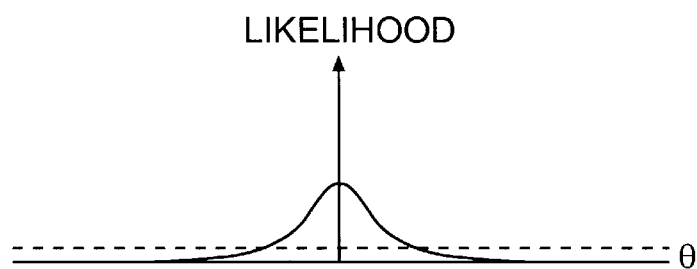
FIG. 8 is a schematic diagram showing a likelihood of the focus of contraction for the optical flow.

The short optical vector includes large uncertainty. In order to solve this problem, the vote method of the present invention is improved. FIG. 7 is a schematic diagram of a voting kernel of the optical flow according to the present invention. As shown in FIG. 7, as for kinds of optical flow, a fan-shaped pattern in which a plurality of probability values are stored along each concentric circle line is calculated in order to correct the uncertainty of the optical flow. In the fan-shaped pattern, a start point of the optical flow is the origin. The same probability values of presence of the optical flow are stored along each concentric circle line. The method for calculating the voting kernel is explained. As mentioned above, extraction of the optical flow results in unavoidable error because of noise in the image. Therefore, direction of the optical flow is represented as a likelihood distribution whose center line is a direction of the extracted optical flow as shown in FIG. 8. This method of calculating likelihood distribution is disclosed in E. P. Simoncelli, E. H. Adelson, and D. J. Heeger, "Probability Distributions of Optical Flow", Procedings of Conference on Computer Vision and Pattern Recognition, pp. 310–315, 1991.

If the optical flow belongs to the background of the image, the focus of contraction is positioned toward the direction of the optical flow. Therefore, presence-direction of the focus of contraction represents the likelihood distribution of a solid line in FIG. 8. Conversely, if the optical flow belongs to the moving object on the image, the presence direction of the focus of contraction represents a uniform distribution of a dotted line as shown in FIG. 8. Because the determination of whether the optical flow belongs to the background or the moving object on the image was not previously made, by adding the likelihood distribution and the uniform distribution in FIG. 8, the presence-direction of the is focus of contraction represented as a solid line in FIG. 9.

Figure 9:
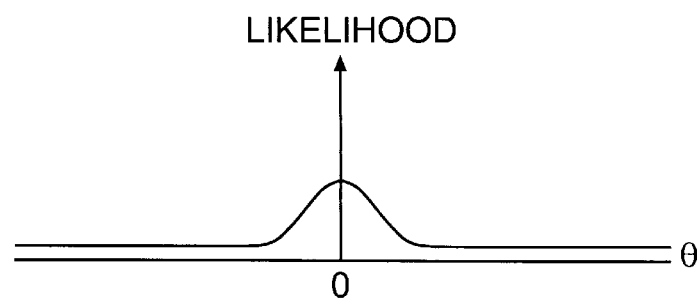
FIG. 9 is a schematic diagram showing a likelihood of the focus of contraction for a sum of optical flows of the background and the moving object.
Figure 10:
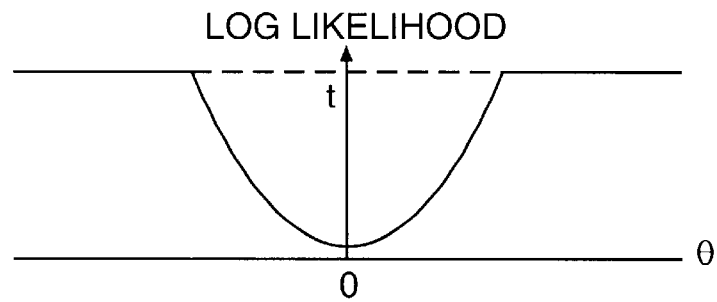
FIG. 10 is a schematic diagram showing a logarithmic likelihood for the focus of contraction shown in FIG. 9.
Figure 11:
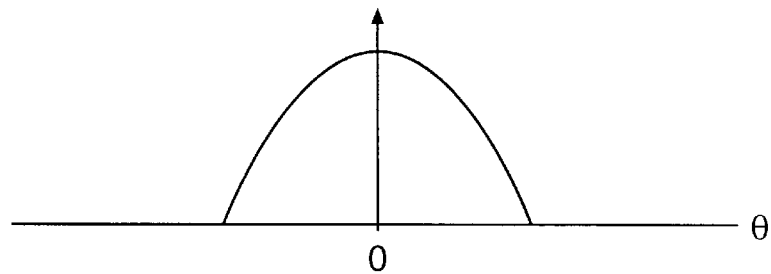
FIG. 11 is a schematic diagram showing an inversion of the logarithmic likelihood shown in FIG. 10.
Figure 12:
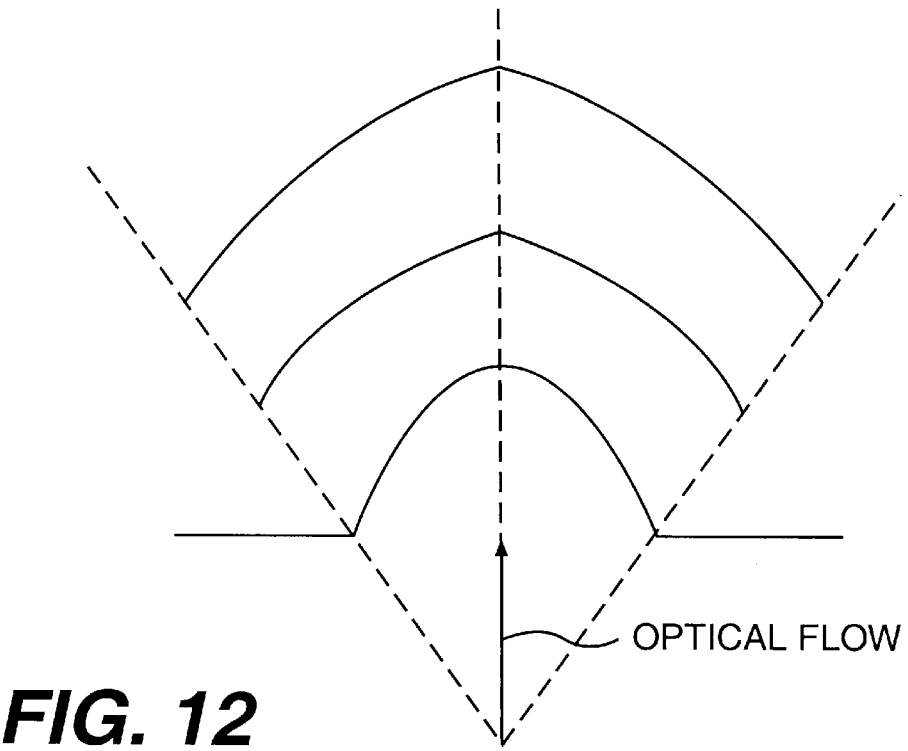
FIG. 12 is a schematic diagram showing a voting kernel based on the inverted logarithmic likelihood shown in FIG. 11.
Figure 13B:
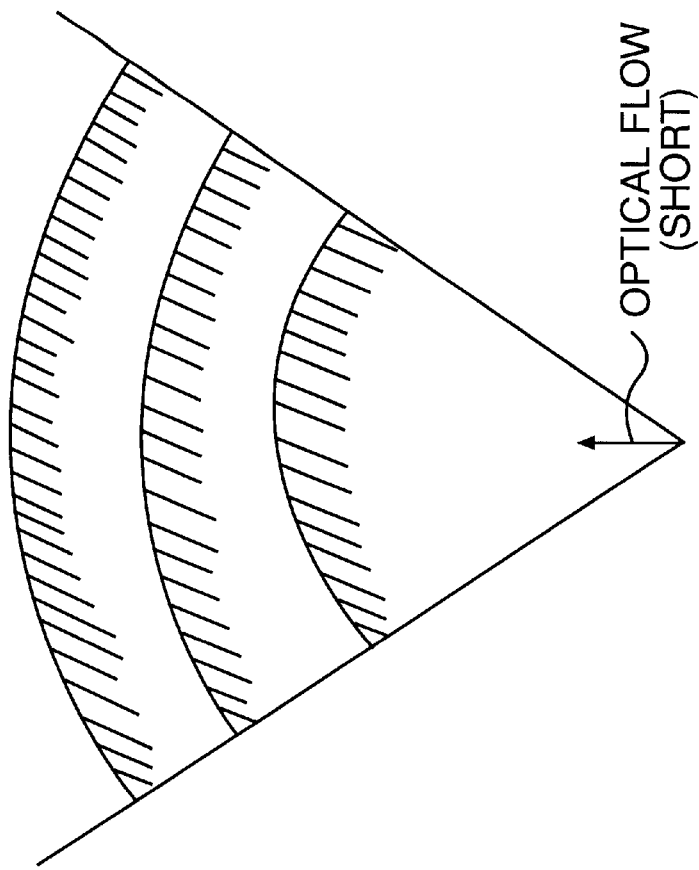
FIGS. 13A and 13B are schematic diagrams of two patterns of the voting kernel shown in FIG. 12.
Figure 13A:
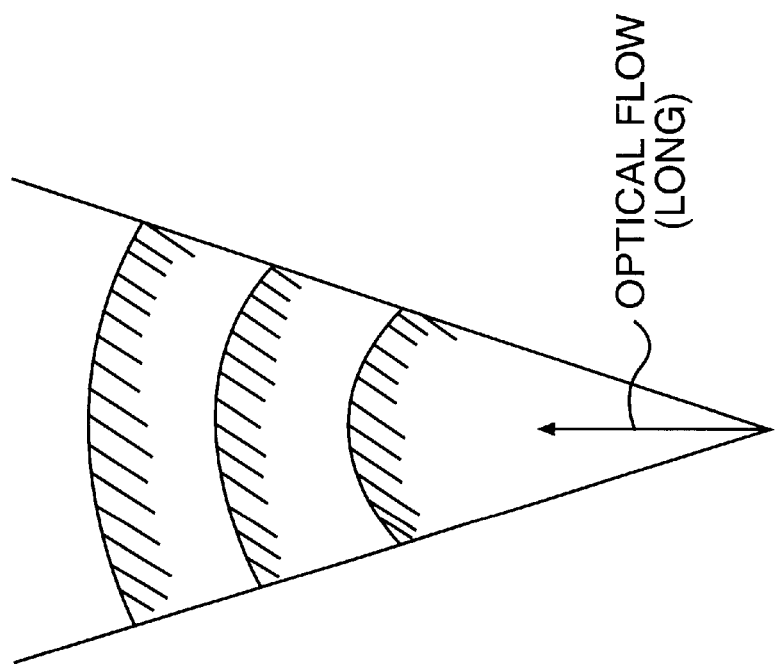

In order to determine a maximum likelihood estimation value of the focus of contraction, the likelihood distribution of all optical flow on the image are multiplied in the vote space and the maximum likelihood is extracted. However, a quantity of calculation increases in case of multiplication of likelihood. If the likelihood distribution is transformed to a logarithmic likelihood distribution, the maximum likelihood estimation value is calculated by the sum of the logarithmic likelihood. Specifically, the likelihood distribution in FIG. 9 is converted to the logarithmic likelihood distribution in FIG. 10. Next, a predetermined value (t) is subtracted from the logarithmic likelihood distribution and the sign is reversed as shown in FIG. 11. The distribution in FIG. 11 is expanded toward the direction of the optical flow as shown in FIG. 12. This distribution is used as a voting kernel for the proposed Hough transform. In this case, for a long optical flow, an voting kernel pattern is fan-shaped whose center angle is acute as shown in FIG. 13A. For a short optical flow, an voting kernel pattern is a fan-shaped whose center angle is obtuse as shown in FIG. 13B.

In the same way, if texture of the block including the optical flow is complicated, the voting kernel in FIG. 13A is prepared because motion vector of the block is clearly decided. If texture of the block including the optical flow is flat, the voting kernel in FIG. 13B is prepared because motion vector of the block is not clearly decided. In this way, various kinds of the voting kernel are previously stored by unit of combination of length of the optical flow and the texture of the block on the image.

Figure 14:
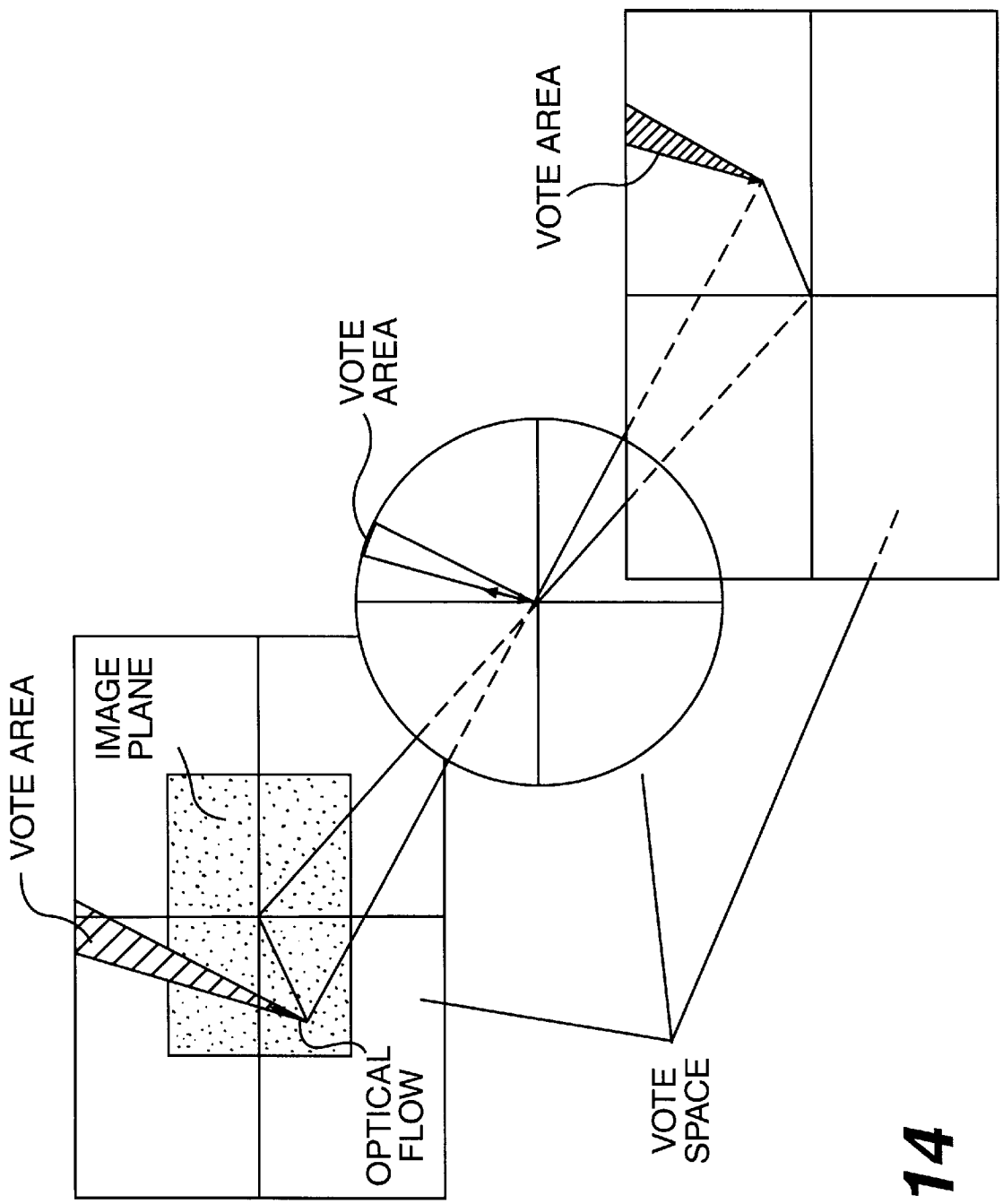
FIG. 14 is a schematic diagram showing probability density distributions in the vote space.

FIG. 14 is a schematic diagram of vote situation of the voting kernel to the vote space. As shown in FIG. 4, the vote space (two planes, one circle) are initialized (step S11 in FIG. 4). Then, an optical flow is extracted from the image plane (step S12 in FIG. 4). When the voting kernel is selected according to the length of the optical flow and the texture of the block (step S13 in FIG. 4), values of the voting kernel are written to each voted area in the two planes and the one circle as shown in FIG. 14 (step S14 in FIG. 4). In this place, the voted area is determined by position of the optical flow on the image plane of the one plane. As for all optical flows on the image plane, the values of the voting kernel are added to a corresponding vote area (step S15 in FIG. 4). The two planes and the one circle are preferably divided by unit of block. As for each block, an average of the added voting kernel is calculated as a voted result. The block whose voted result is maximum in all blocks of the vote space is searched (step S16 in FIG. 4). The searched block corresponds to the focus of contraction of the optical flow of background. Because the optical flow of the background on the image corresponds to the block, including a maximum of the voting kernel, the optical flow of the background on the image is correctly extracted as the direction toward the focus of contraction.

Figure 15:
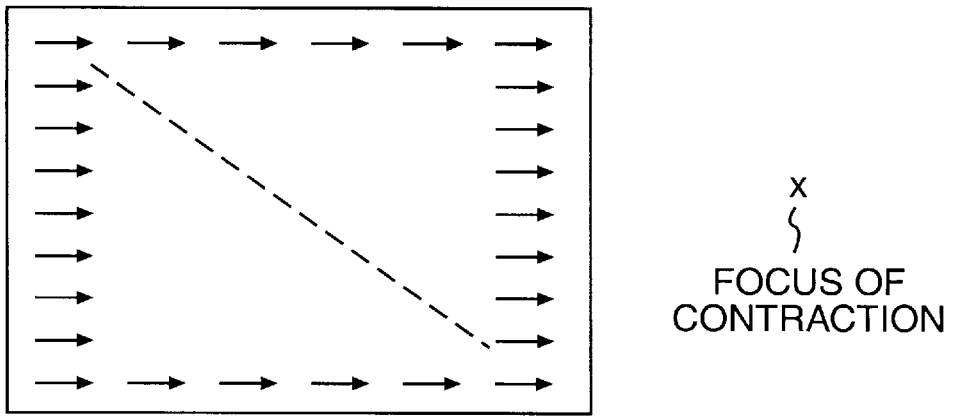
FIG. 15 is a schematic diagram of optical flows in the dynamic image where the focus of contraction is at infinity.
Figure 16:
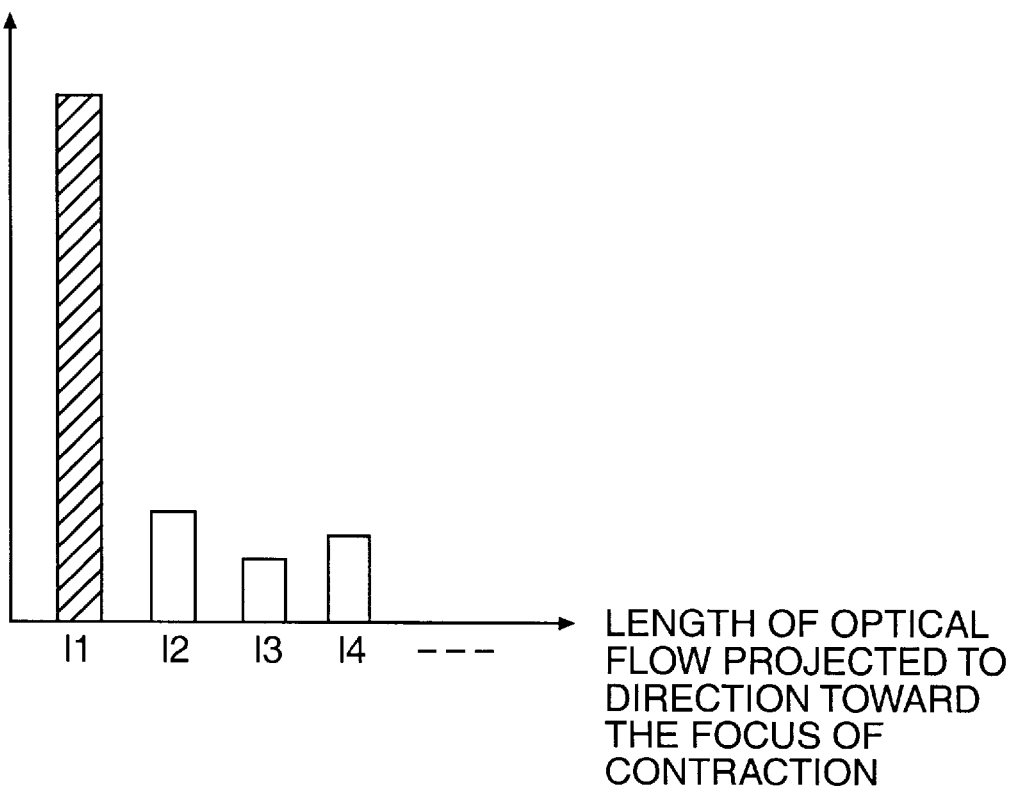
FIG. 16 is a schematic diagram showing a histogram containing lengths of the optical flow projected in a direction toward the focus of contraction.
Figure 17:
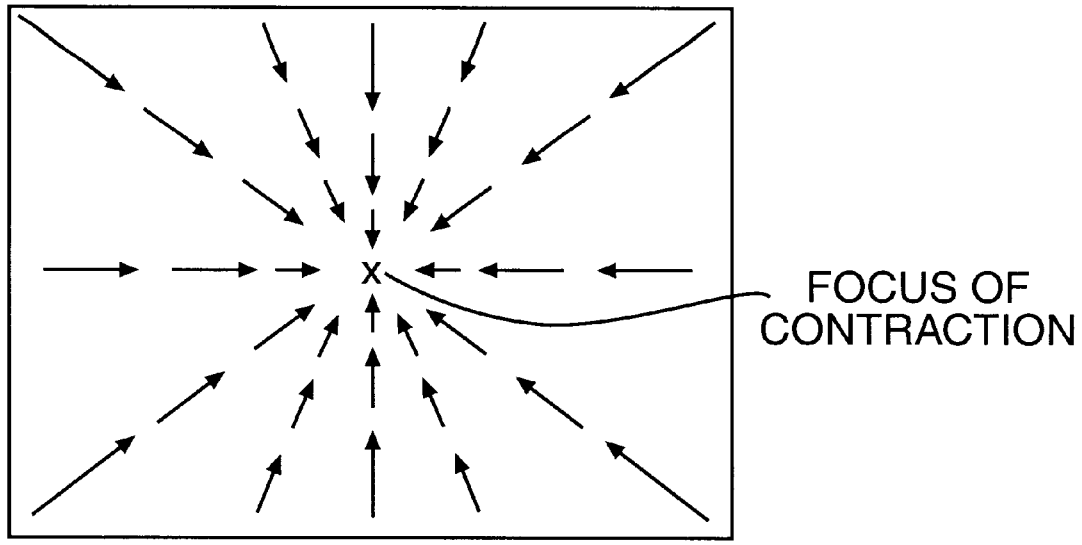
FIG. 17 is a schematic diagram of optical flows in the dynamic image where the focus of contraction is included in the dynamic image.

The processing of the camera parameter extraction section 4 is explained. In case that position of the camera (the image input section 1) moves in parallel, the focus of contraction represents the direction that the camera if moving. Where the camera operates to pan, tilt, or zoom, operation quantity of the camera is estimated by the optical flow toward the focus of contraction. Where the focus of contraction is an infinite distant point and relative moving between the camera and the background is closely resembled by pan or tilt, the optical flows belonging to the background include a predetermined length as shown in FIG. 15. In this case, each optical flow is projected to a direction toward the focus of contraction and a histogram is counted by unit of length of projected optical flow as shown in FIG. 16. In FIG. 16, a maximum in histogram is length (11). Therefore, the length (11) represents moving parameter (distance) along the direction of the focus of contraction. Where the focus of contraction is not the infinite distant point and the relative movement between the camera and the background is closely resembled by zoom, the optical flows belonged to the background include length in proportion to a distance between each optical flow and the focus of contraction in the image as shown in FIG. 17. Therefore, each optical flow is divided by the distance in order to normalize the length of the optical flow. Then, in the same way, the normalized optical flow is projected to the direction toward the focus of contraction and the histogram is counted by unit of length of projected optical flow. The length corresponding to the maximum of the histogram is extracted as zoom parameter toward the focus of contraction.

The processing of the optical flow correction section 5 is explained. If the optical flow of the background is determined, the moving object is separated from the background of the image by comparing the optical flow with the focus of contraction. However, in the present technique, it is impossible to correctly extract the optical flow at step of input of the image. Accordingly, before the processing of separation of the moving object is executed, it is necessary to correct the optical flow in the image. After the optical flow of the background is determined, the camera-parameter is estimated where pan, tilt, zoom serve as the operations. Therefore, for each of pixel in the image, a motion vector of the pixel is estimated if the pixel belongs to the background.

The motion vector of the pixel is compared with corresponding pixel of a next image. If the pixel belongs to the background, a difference value between the moved pixel and the corresponding pixel is below a threshold. If the pixel does not belong to the background, the difference above the thresthold is computed. Therefore, by setting an adequate threshold, the optical flow of the background is corrected, even if the optical flow of the background is mistakenly extracted as that of the moving object.

The processing of the move object separation section 6 is explained. If the optical flow of the background is corrected, each optical flow of the background points to the focus of contraction. Therefore, by unit of block, the average or the distribution of the optical flows in the block is calculated and compared with a threshold to decide which blocks are included in the background. The method for calculating the threshold is disclosed in E. P. Simoncelli, E. H. Adelson, and D. J. Heeger, "Probability Distributions of Optical Flow", Procedings of Conference on Computer Vision and Pattern Recognition, pp.310–315, 1991.

Figure 18:
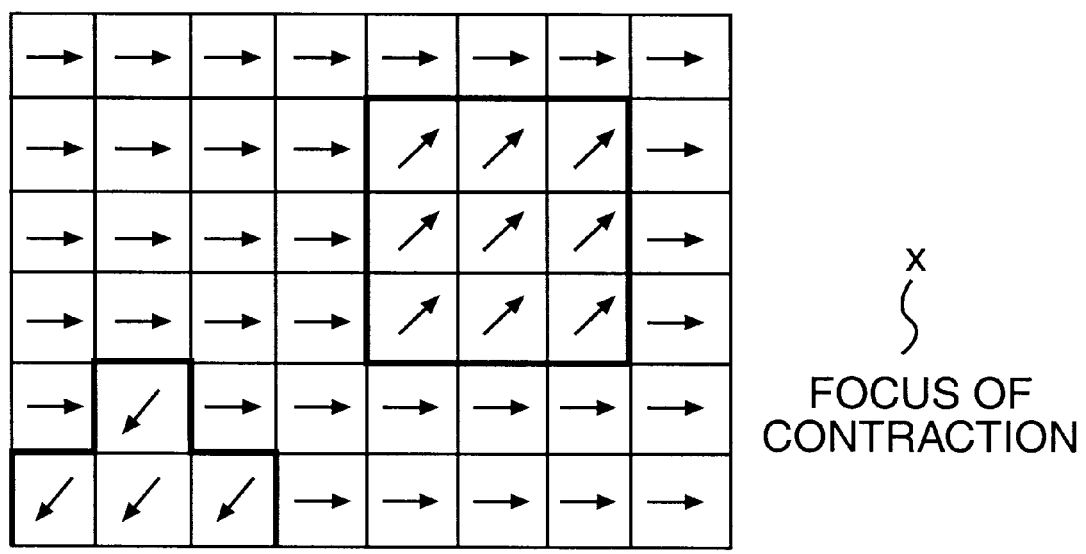
FIG. 18 is a schematic diagram of optical flows for respective blocks in the dynamic image to permit separation of the moving object from the background.

FIG. 18 is a schematic diagram of the optical flows (average) of each block in the image. The optical flows pointing to the focus of contraction belongs to the background. The optical flows not pointing to the focus of contraction belongs to the moving object (These blocks are included in two areas surrounded by the black thick lines).

A memory can be used to store instructions for performing the process described above, such a memory can be a CD-ROM, floppy disk, hard disk, magnetic tape, or a semiconductor memory.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A dynamic image processing apparatus, comprising:

image input means for inputting a series of dynamic images including pixels, wherein a focal length of said image input means is unknown;

optical flow extraction means for extracting an optical flow representing a motion vector for each pixel between two neighboring dynamic images;

memory means for storing a plurality of kernel patterns corresponding to a length of the optical flow, wherein the kernel patterns are fan-shaped patterns expanding toward a direction from a start point to an end point of the optical flow having a plurality of probability values stored along each concentric circle line in the fan-shaped patterns;

kernel pattern selecting means for selecting a kernel pattern corresponding to the length of the optical flow from said memory means;

adding means for adding the probability values of the selected kernel pattern for two planes and one circle to a block, wherein the two planes and one circle are positioned in parallel to each other, such that the dynamic image is included in the first of the two planes, and the second of the two planes is positioned symmetrically to the first plane with respect to a center position of the circle, and wherein the probability values added to the block correspond to a position of the optical flow in the two planes and one circle; and block selecting means for selecting a block whose sum of the added probability values is a maximum of all blocks of the two planes and one circle after adding the probability values of all selected kernel patterns, wherein the selected block corresponds to a focus of contraction of the optical flow of background in the dynamic image.

2. The dynamic image processing apparatus according to claim 1, wherein the kernel pattern is calculated by adding a likelihood of the optical flow of the background and a likelihood of the optical flow of a move object in the dynamic image, by inverting a logarithm of the addition result and by distributing the inverted logarithm toward a direction from the start point to the end point of the optical flow.

3. The dynamic image processing apparatus according to claim 1, further including a camera parameter extraction means for projecting each optical flow of the dynamic image to a direction toward the focus of contraction where the focus of contraction is an infinite distant point, for calculating a histogram by unit of length of the projected optical flow, and for selecting one length of the histogram whose value is a maximum as a parallel moving parameter of a camera to input the dynamic image.

4. The dynamic image processing apparatus according to claim 3, wherein said camera parameter extraction means includes means for dividing each optical flow of the dynamic image by a distance between the focus of contraction and the optical flow where the focus of contraction is included in the dynamic image, for projecting the divided optical flow to a direction toward the focus of contraction in the dynamic image, for calculating a histogram by unit of length of the projected optical flow, and for selecting one length of the histogram whose value is maximum as a zoom parameter of the camera.

5. The dynamic image processing apparatus according to claim 3, further including:

an optical flow correction means for predicting movement of each pixel of the dynamic image in accordance with the focus of contraction of the optical flow of the background;

means for comparing a predicted pixel with a corresponding pixel of a neighboring dynamic image; and means for correcting the optical flow of the dynamic image if a value of the predicted pixel is different from a value of the corresponding pixel.

6. The dynamic image processing apparatus according to claim 5, further including a move object separation means for calculating an average of the optical flows by unit of block in the dynamic image, and for deciding whether the block corresponds to the background or not by comparing the average with a threshold.

7. A method for processing a dynamic image, comprising the step of:

inputting a series of dynamic images including pixels, wherein a focal length of said image input means is unknown;

extracting an optical flow representing a motion vector for each pixel between two neighboring dynamic images;

storing a plurality of kernel patterns corresponding to a length of the optical flow, wherein the kernel patterns are fan-shaped patterns expanding toward a direction from a start point to an end point of the optical flow having a plurality of probability values stored along each concentric circle line in the fan-shaped patterns;

selecting a kernel pattern corresponding to the length of the optical flow from said memory means;

adding the probability values of the selected kernel pattern for two planes and one circle to a block, wherein the two planes and one circle are positioned in parallel to each other, such that the dynamic image is included in the first of the two planes, and the second of the two planes is positioned symmetrically to the first plane with respect to a center position of the circle, and wherein the probability values added to the block correspond to a position of the optical flow in the two planes and one circle; and selecting a block whose sum of the added probability values is a maximum of all blocks of the two planes and one circle after adding the probability values of all selected kernel patterns, wherein the selected block corresponds to a focus of contraction of the optical flow of background in the dynamic image.

8. A computer readable memory containing computer-readable instructions to process a dynamic image, comprising:

inputting a series of dynamic images including pixels, wherein a focal length of said image input means is unknown;

instruction means for causing a computer to extract an optical flow representing a motion vector for each pixel between two neighboring dynamic images;

instruction means for causing a computer to store a plurality of kernel patterns corresponding to a length of the optical flow, wherein the kernel patterns are fan-shaped patterns expanding toward a direction from a start point to an end point of the optical flow having a plurality of probability values stored along each concentric circle line in the fan-shaped patterns;

instruction means for causing a computer to select a kernel pattern corresponding to the length of the optical flow from said memory means;

instruction means for causing a computer to add the probability values of the selected kernel pattern for two planes and one circle to a block, wherein the two planes and one circle are positioned in parallel to each other, such that the dynamic image is included in the first of the two planes, and the second of the two planes is positioned symmetrically to the first plane with respect to a center position of the circle, and wherein the probability values added to the block correspond to a position of the optical flow in the two planes and one circle; and instruction means for causing a computer to select a block whose sum of the added probability values is a maximum of all blocks of the two planes and one circle after adding the probability values of all selected kernel patterns, wherein the selected block corresponds to a focus of contraction of the optical flow of background in the dynamic image.

* * * * *